US012618767B2

(12) United States Patent (10) Patent No.: US 12,618,767 B2
Zahrt et al. (45) Date of Patent: May 5, 2026

(54) TEST CHAMBER AND METHOD FOR ITS OPERATION

(71) Applicant: Weiss Technik GmbH, Reiskirchen (DE)

(72) Inventors: Yannik Zahrt, Rabenau (DE); Felix Diehl, Laubach (DE); Christian Haack, Marburg (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 281 days.

(21) Appl. No.: 18/228,052

(22) Filed: Jul. 31, 2023

(65) Prior Publication Data

US 2024/0044774 A1 Feb. 8, 2024

(30) Foreign Application Priority Data

Aug. 2, 2022 (EP) .................................... 22188399

(51) Int. Cl.
 *G01N 17/00* (2006.01)
 *B01L 1/02* (2006.01)
 (Continued)

(52) U.S. Cl.
 CPC ............ *G01N 17/002* (2013.01); *F24F 11/84* (2018.01); *G01M 99/002* (2013.01)

(58) Field of Classification Search
 CPC .... G01N 17/002; F24F 11/84; G01M 99/002; B01L 1/025; F25B 7/00; F25B 25/005;

F25B 2500/222; F25B 2700/2103; F25B 49/02; F25B 2400/0403; F25B 2400/0411; F25B 2500/26; F25B 9/002; F25B 41/20;

(Continued)

(56) References Cited

U.S. PATENT DOCUMENTS 10,330,556 B2 6/2019 Furumoto et al.
2014/0260376 A1 9/2014 Kopko et al.
(Continued)

FOREIGN PATENT DOCUMENTS

CN 109060391 A * 12/2018 .......... G01M 99/008
CN 113607448 A * 11/2021 .......... G01M 99/002
(Continued)

*Primary Examiner* — Laura Martin
*Assistant Examiner* — Anthony W Megna Fuentes
(74) *Attorney, Agent, or Firm* — Quarles & Brady LLP

(57) ABSTRACT

A test chamber and a method for conditioning air in which the test chamber comprises a temperature-insulated test space, which is closable to an environment and serves to receive test material, and a temperature control device for controlling the test space in temperature, a temperature ranging from −40° C. to +180° C. being generable within the test space by the temperature control device. The temperature control device comprises a cooling apparatus having a first and second cooling cycle, the first cooling cycle having a first refrigerant, a first heat exchanger, a first compressor, a first condenser and a first expansion element, the first refrigerant being a hydrocarbon or a refrigerant mixture made of hydrocarbons. The second cooling cycle has a heat transfer medium, a second heat exchanger in the test space and a pump, the second cooling cycle being coupled to the first cooling cycle by the first heat exchanger.

12 Claims, 11 Drawing Sheets

(51) Int. Cl.

| | | |
|---|---|---|
| *F24F 11/84* | (2018.01) | |
| *F25B 7/00* | (2006.01) | |
| *F25B 25/00* | (2006.01) | |
| *F25B 41/20* | (2021.01) | |
| *F25B 41/26* | (2021.01) | |
| *F25B 41/30* | (2021.01) | |
| *F25B 41/40* | (2021.01) | |
| *F25B 41/42* | (2021.01) | |
| *F25B 49/02* | (2006.01) | |
| *G01M 99/00* | (2011.01) | |

(58) Field of Classification Search
CPC .......... F25B 41/26; F25B 41/30; F25B 41/40;
F25B 41/42
See application file for complete search history.

(56) References Cited

U.S. PATENT DOCUMENTS

| | | | |
|---|---|---|---|
| 2019/0383524 A1* | 12/2019 | Haack ..................... | F25B 49/02 |
| 2021/0116151 A1 | 4/2021 | Yamawaki et al. | |
| 2021/0140685 A1 | 5/2021 | Yamawaki et al. | |

FOREIGN PATENT DOCUMENTS

| | | | |
|---|---|---|---|
| EP | 0344397 A2 | 12/1989 | |
| WO | 2019048250 A1 | 3/2019 | |

* cited by examiner

40

TEST CHAMBER AND METHOD FOR ITS OPERATION

This patent application claims priority of the European Patent Application No. 22188399.4 filed on Aug. 2, 2022, the disclosure of which is incorporated herein by reference.

The invention relates to a method and a test chamber for conditioning air, in particular a climate chamber or the like, the test chamber comprising a temperature-insulated test space, which is closable to an environment and serves for receiving test material, and a temperature control device for controlling the test space in temperature, a temperature ranging from –40° C. to +180° C. being generable within the test space by means of the temperature control device, the temperature control device comprising a cooling apparatus having a first cooling cycle and a second cooling cycle, the first cooling cycle having a first refrigerant, a first heat exchanger, a first compressor, a first condenser and a first expansion element, the first refrigerant being a hydrocarbon or a refrigerant mixture made of hydrocarbons.

Test chambers of this kind are commonly used for observing physical and/or chemical properties of objects, in particular devices. Temperature test consoles or climate test consoles are thus known, within which temperatures ranging from –40° C. to +180° C. can be set. In climate test consoles, desired climate conditions can be additionally set, to which devices and/or the test material are exposed over a defined period of time. A temperature of the test space to receive the test material is regularly controlled in a circulating-air channel within the test space. The circulating-air channel forms an air-treatment space in the test space, heat exchangers for heating or cooling the air flowing through the circulating-air channel and/or the test space being disposed in the air-treatment space. In this context, a fan suctions the air present in the test space and conducts it in the circulating-air channel to the corresponding heat exchangers. The temperature of the test material can be controlled thus or even be subjected to a defined change in temperature. During a test interval, a temperature can change between a temperature maximum and a temperature minimum of the test chamber, for example. A test chamber of this kind is known from EP 0 344 397 A2, for example.

The refrigerant used in a cooling cycle should have a relative low $CO_2$ equivalent, i.e., a relative greenhouse potential or Global Warming Potential (GWP) should be as low as possible in order to avoid indirectly damaging the environment via the refrigerant upon its release. While it is also known to use hydrocarbons as a refrigerant, however, it is disadvantageous that hydrocarbons are easily inflammable. Inflammability is understood as the property of the refrigerant to react with ambient oxygen while releasing heat. A refrigerant is inflammable in particular when it falls under fire class C according to European standard DN 2 or DIN 378 classes A2, A2L and A3 in the version valid on the day of priority. If an inflammable refrigerant is used, a filling, a shipment and an operation of a cooling cycle and/or of a test chamber is made more complicated because of the security measures to be maintained. Production of the test chamber can also become more expensive because of the usage of an inflammable refrigerant as a consequence of the constructive measures consequently required. A significant problem is a possible leakage of the cooling cycle within the test space, in which electric resistance heaters and also electrically operated devices can be present as test material. In the event of a leakage, an explosion can be the result.

As a result of statutory provisions, a refrigerant must not significantly contribute to the ozone depletion in the atmosphere or to global warming. Thus, essentially no fluorinated gases or fluorinated substances are to be used as refrigerants, for which reason natural refrigerants, such as carbon dioxide ($CO_2$) are considered. A disadvantage of refrigerants having low GWP is that these refrigerants have a partially significantly lower cooling performance in comparison to refrigerants having comparatively higher GWPs in the temperature ranges relevant for a cooling cycle. A lower GWP can be attained with refrigerant mixtures, which have a comparatively high mass fraction of carbon dioxide, these refrigerant mixtures having zeotropic properties because of the different substances mixed with each other, which in turn is not desired in most cooling cycles. Moreover, a fraction of carbon dioxide must be large enough that the refrigerant is nonflammable. From WO 2019/048250 A1, a test chamber having a refrigerant is known, which consists essentially of carbon dioxide, pentafluoroethane and difluoromethane. A disadvantage in this case is that supercooling the refrigerant by means of an internal heat exchanger in a cooling cycle is required to attain particularly low temperatures. Further, the refrigerant has zeotropic properties and contains fluorinated gases as components.

The object of the invention at hand is therefore to propose a test chamber and a method for conditioning air by means of a test chamber, both the test chamber and the method safely ensuring efficient operation of the test chamber using simple means.

This object is attained by a test chamber as disclosed herein and a method as disclosed herein.

The test chamber according to the invention for conditioning air, in particular a climate chamber or the like, comprises a temperature-insulated test space, which is closable to an environment and serves for receiving test material, and a temperature control device for controlling the test space in temperature, a temperature ranging from –40° C. to +180° C., preferably from –60° C. to +180° C., particularly preferably from –80° C. to +180° C., being generable within the test space by means of the temperature control device, the temperature control device comprising a cooling apparatus having a first cooling cycle and a second cooling cycle, the first cooling cycle having a first refrigerant, a first heat exchanger, a first compressor, a first condenser and a first expansion element, the first refrigerant being a hydrocarbon or a refrigerant mixture made of hydrocarbons, the second cooling cycle being made of a heat transfer medium, a second heat exchanger in the test space and a pump, the second cooling cycle being coupled to the first cooling cycle by means of the first heat exchanger.

Consequently, the cooling apparatus can be designed in the manner of a two-step cooling installation; however, a heat transfer medium is used in the second cooling cycle instead of a refrigerant and a pump is used instead of a compressor. It is generally intended for the heat transfer medium to be circulated in the second cooling cycle by means of the pump, the heat transfer medium also flowing through the first heat exchanger of the first cooling cycle in this context. At the first heat exchanger, the heat transfer medium is cooled, meaning a cooling performance occurring at the first heat exchanger can be transported or conveyed to the second heat exchanger, which is in the test space, via the heat transfer medium. Further, the first heat exchanger is cooled via the first cooling cycle, which is operated using a refrigerant which is a hydrocarbon or a refrigerant mixture made of hydrocarbons and, if applicable, other components. The first heat exchanger and/or the heat exchangers can be plate heat exchangers, in particular double-walled plate heat exchangers. This constructive design of the cooling apparatus and in particular the fact that the second heat exchanger is in the test space can prevent the first refrigerant from leaking in the test space. Thus, it can be precluded that an explosion or catastrophe occurs as a result of refrigerant entering the test space from the second cooling cycle. Nevertheless, it is also possible to use a hydrocarbon or a refrigerant mixture made of hydrocarbons as a refrigerant using the first cooling cycle. For this reason, the refrigerant can be an azeotropic refrigerant. Furthermore, a refrigerant can be chosen, which has a low GWP and with which a low temperature can be attained at the first heat exchanger, and therefore at the second heat exchanger. In addition, the second cooling cycle can be formed using simple means, as a specific pressure is not required in the second cooling cycle, as is the case for a refrigerant. In the second cooling cycle, only a circulation of the heat transfer medium using the pump has to be possible. Overall, the cooling apparatus and/or the test chamber can thus enable using hydrocarbons as refrigerants and simultaneously be operated safely, without the danger of an explosion in the test space.

Consequently, the first refrigerant can be inflammable and the heat transfer medium can be nonflammable. The first refrigerant can be present in the first cooling cycle in the gaseous and/or liquid phase. For instance, the first refrigerant can be propane, ethane, ethylene, propene, isobutene, butane or the like. The first refrigerant can also be a refrigerant mixture made of hydrocarbons and/or the components mentioned above or a refrigerant mixture having mostly hydrocarbons. The heat transfer medium can be present in the gaseous phase or preferably in the liquid phase and be circulated in the second cooling cycle without a phase change and/or without a changeable pressure. While a phase change of the heat transfer medium is possible, however, it does not occur as a result of the second cooling cycle, as is the case in a refrigerating machine having a compressor, a condenser and an expansion element. This phase change can take place, for example, as a function of a temperature of the heat transfer medium, independently of a pressure of the heat transfer medium. The heat transfer medium can circulate in the second cooling cycle at a temperature ranging from −40° C. to +180° C., preferably −70° C. to +200° C., particularly preferably −85° C. to +230° C. The heat transfer medium can be an oil or a thermal oil or a molten salt, for example. When a heat transfer medium of this kind enters the test space, the heat transfer medium consequently cannot be ignited and thus an explosion cannot occur.

The first refrigerant can be free of fluorinated hydrocarbons. This makes it possible to fulfill future requirements for refrigerants and to avoid the disadvantages of fluorinated hydrocarbons.

A storage apparatus for the heat transfer medium can be disposed in the second cooling cycle. The storage apparatus can be a tank, for example, which is disposed directly upstream of the pump. The storage apparatus can ensure that the pump is always supplied with the heat transfer medium. Further, the storage apparatus can serve as a kind of compensation container to compensate a heat expansion of the heat transfer medium. Furthermore, a comparatively large amount of heat transfer medium can be stored in the storage apparatus. This can be particularly advantageous when a temperature between −20° C. to +40° C. is required. By means of the first cooling cycle, the heat transfer medium can initially be brought to a desired temperature and/or be chilled and be stored in the storage apparatus. By means of the pump or, for example, valves, the heat transfer medium can be dosed from the storage apparatus and be conducted in such a manner through the second heat exchanger that the desired temperature can be generated in the test space. The first cooling cycle and/or the first compressor can also be switched off, meaning that energy can be saved for a continuous operation of the first compressor. The first compressor can be switched on and off in comparatively long intervals, which prolongs a service life of the first compressor.

The cooling apparatus can have another cooling cycle having another refrigerant, another compressor, another condenser and another expansion element, the other cooling cycle being able to be coupled to the first condenser of the first cooling cycle by means of another heat exchanger. The other cooling cycle can accordingly cool the first condenser. The cooling apparatus can consequently be designed as a two-step cooling apparatus having cascading cooling cycles. The other refrigerant can correspond to the first refrigerant or deviate from the first refrigerant. Nevertheless, the other refrigerant can be a hydrocarbon or a refrigerant mixture made of hydrocarbons. Thus, it is also possible to generate particularly low temperatures in the test space. The other compressor, like the first compressor, can be a compressor.

The other cooling cycle can have another bypass having a third heat exchanger and a third expansion element, the other bypass being connected downstream of the other condenser and upstream of the other expansion element as well as downstream of the other heat exchanger and upstream of the other compressor, more refrigerant being able to be dosed in the other heat exchanger via the third expansion element, the second cooling cycle being able to be coupled to the third heat exchanger of the other cooling cycle. Via the other bypass, the other cooling cycle accordingly can be directly coupled to the second cooling cycle via the third heat exchanger. This makes it possible to operate the first cooling cycle and/or the first compressor together with the other cooling cycle and the other compressor depending on the required temperature in the test space or operate the other cooling cycle only with the other compressor and to cool the heat transfer medium via the other bypass. This is advantageous in particular when a temperature is to be generated in the test space which can also be attained using the other cooling cycle. Thus, energy for operating the first compressor can be saved. If lower temperatures are required in the test space, the third expansion element can be closed, meaning no further refrigerant flows via the other bypass. Nevertheless, the other expansion element can be used to cool the first condenser of the first cooling cycle via the other heat transfer medium while operation of the first compressor is continued. At the first heat exchanger, a significantly lower temperature can be generated. Advantageously, a non-return valve can be disposed in the other bypass, preferably downstream of the third heat exchanger and upstream of the other compressor and/or the other heat exchanger. This can prevent the further refrigerant from returning to the third heat exchanger when the other cooling cycle is operated via the other expansion element.

The third heat exchanger can be connected in the second cooling cycle downstream of the first heat exchanger and upstream of the second heat exchanger. Generally, however, it is also possible to connect the third heat exchanger in the second cooling cycle upstream of the first heat exchanger and downstream of the pump.

A first bypass can be designed having at least one first magnet valve in the first cooling cycle, the first bypass being able to be connected downstream of the first compressor and upstream of the first condenser as well as downstream of the first expansion element and upstream of the first heat exchanger, first refrigerant being able to be dosed such via the first magnet valve that a temperature of the first refrigerant can be increased at the first heat exchanger. This first bypass makes it possible to heat the heat transfer medium via the first heat exchanger and to thus increase a temperature in the test space when desired. Via the first magnet valve, hot gas can be introduced directly in the first heat exchanger downstream of the first compressor when operating the first compressor. For instance, the heat transfer medium can be heated to +90° C. This allows attaining a higher homogeneity and temporal regulation precision of a temperature at the second heat exchanger in small load ranges, for example during constant operation at +50° C. to +80° C.

Furthermore, the temperature control device can have a heating apparatus having a heater and a thermal heat exchanger. The thermal heat exchanger can then be disposed in the test space. For instance, the thermal heat exchanger can have an electric heating element. This makes it possible to generate a temperature of up to +180° C. or higher in the test space.

The temperature control device can comprise a regulator having at least one temperature sensor in the second cooling cycle, at least one valve apparatus being able to be actuated in the second cooling cycle by means of the regulator as a function of a measured temperature. The valve apparatus can serve to adjust a circulation of the heat transfer medium in the second cooling cycle in such a manner that a desired temperature is achieved in the test pace or a target temperature is achieved. The temperature sensor can be disposed in the test space. Equally, further temperature sensors can be present which allow measuring the temperature of the heat transfer medium and the refrigerant.

The second cooling cycle can have a second bypass having the valve apparatus, the second bypass being able to be connected downstream of the first heat exchanger and upstream of the second heat exchanger as well as downstream of the second heat exchanger and upstream of the pump, the heat transfer medium being able to be dosed in such a manner via the valve apparatus that the second heat exchanger can be bridged by means of the second bypass. When flowing via the second bypass, the heat transfer medium cannot flow through the second heat exchanger. Thus, it can be intended for the heat transfer medium to first be cooled far enough via the first cooling cycle that the heat transfer medium has a desired temperature. Subsequently, via the valve apparatus, the heat transfer medium can be conducted via the second heat exchanger such that the test space can be cooled only at that time.

For this purpose, the valve apparatus can have a second magnet valve downstream of the first heat exchanger and upstream of the second heat exchanger and another magnet valve or a differential pressure regulator in the second bypass. The second magnet valve and the other magnet valve can run in a clocked manner, meaning the desired temperature can always be generated at the second heat exchanger. Alternatively, a fixedly set differential pressure regulator can be used in the second bypass instead of the other magnet valve. The differential pressure regulator can be set such that a dropping pressure via this differential pressure regulator is larger than a pressure drop via the second heat exchanger. This allows a mass flow via the differential pressure regulator to occur if the second magnet valve is closed. Thus the other magnet valve or its control advantageously is no longer required.

Alternatively, the valve apparatus can be formed having a three-way valve, which can be disposed downstream of the second heat exchanger and upstream of the pump in the second cooling cycle, the second bypass being able to be connected to the three-way valve. By means of the three-way valve, the second heat exchanger can be optimally supplied, whereby a high regulation precision can be attained, as the three-way valve does not close completely. The three-way valve can be controlled via a stepper motor valve and thus a relation of a mass flow between the second bypass and the second heat exchanger can be optimally adjusted depending on the load state.

The test chamber can comprise a detector having at least one gas sensor and a ventilation installation in an engine room of the test chamber separated from the test space in an airtight manner, the first cooling cycle and preferably another cooling cycle being able to be disposed entirely in the engine room. Using the detector, it becomes possible in the event of a leakage of the first cooling cycle and or the other cooling cycle to identify the leakage via the gas sensor and to vent the engine room by means of the ventilation installation. Since the first cooling cycle and optionally the other cooling cycle can be disposed entirely in the engine room, first refrigerant or other refrigerant can enter only the engine room. The gas sensor can be disposed at a lowest possible position in the engine room so that possibly leaking hydrocarbon or refrigerant can be detected as quickly as possible. To prevent an evaporation of leaking refrigerant in the engine room, possible openings in the engine room can be formed above the gas sensor, for example 10 cm above the gas sensor. This ensures that leaking hydrocarbon, which naturally collects at a bottom of the engine room owing to its large density, can be safely detected by means of the gas sensor. Further, it can be intended that the ventilation installation is disposed directly at the bottom of the engine room. The ventilation installation can be formed by an ATEX-certified fan. The fan can then be operated if the gas sensor detects hydrocarbons. A vent pipe of the fan can extend outside of the engine room of the test chamber.

In the method for conditioning air in a temperature-insulated test space of a test chamber, in particular a climate chamber or the like, the test space being closable to an environment and serving to receive test material, a temperature ranging from −40° C. to +180° C. being generable within the test space by means of a temperature control device of the test chamber, a temperature being generated within the test space by means of a cooling apparatus of the temperature control device having a first cooling cycle and a second cooling cycle, the first cooling cycle having a first refrigerant, a first heat exchanger, a first compressor, a first condenser and a first expansion element, the first refrigerant being a hydrocarbon or a refrigerant mixture made of hydrocarbons, the second cooling cycle being made of a heat transfer medium, a second heat exchanger in the test space and a pump, the second cooling cycle being coupled to the first cooling cycle by means of the first heat exchanger, the heat transfer medium being circulated in the second cooling cycle by means of the pump. Reference is made to the description of advantages of the test chamber according to the invention regarding the advantageous effects of the method according to the invention.

The heat transfer medium can be circulated in the second cooling cycle without phase changes. A pressure of the heat transfer medium is therefore essentially constant in the second cooling cycle and can vary merely via a flow resistance and/or heat expansion in the second cooling cycle.

A valve apparatus can be actuated in the second cooling cycle as a function of a measured temperature by means of a regulator of the temperature control device using at least one temperature sensor in the second cooling cycle, the heat transfer medium being able to be circulated in the second cooling cycle via the second heat exchanger and/or a second bypass by means of the valve device. Depending on the desired temperature in the test space and/or at the second heat exchanger, it can be intended to allow the heat transfer medium to flow or circulate via the second bypass, via the second heat exchanger or via the second bypass and the second heat exchanger.

The heat transfer medium can be circulated via the second bypass until a target temperature of the heat transfer medium can be reached, the heat transfer medium being able to be circulated via the second heat exchanger when the target temperature has been reached. Accordingly, it can be intended to initially circulate the heat transfer medium via the second bypass until the heat transfer medium is brought to the target temperature via the first heat exchanger and optionally via the third heat exchanger. Subsequently, the heat transfer medium can be used to control the temperature in the test space via the second heat exchanger. It is essential that first the temperature of the heat transfer medium is controlled in a first step before the temperature of the test space is controlled in a second step. Otherwise, it could occur that comparatively warmer heat transfer medium flows via the second heat exchanger and thereby initially increases a temperature in the test space, even though a lowered temperature is desired in the test space.

A revolution speed of the pump can be regulated by means of the regulator. A possible revolution-speed adjustment of the pump can be used for regulating a supply amount of the heat transfer medium in a constant operation of the pump. This allows regulating a temperature in the test space even more precisely. Furthermore, energy required for operating the pump can also be saved when lowering the revolution speed of the pump. The revolution speed of the pump can be regulated in conjunction with the valve apparatus by means of the regulator. For instance, a limit of the supply amount can be set via the valve apparatus and/or via the regulation of the revolution speed.

Upon reaching a target temperature of the heat transfer medium, the first compressor can be switched off by means of the regulator, the heat transfer medium being able to be circulated in the second cooling cycle and the second heat exchanger via a storage apparatus for the heat transfer medium, and/or the second cooling cycle being able to be coupled to a third heat exchanger of another cooling cycle, to another refrigerant, to another compressor, to another condenser and to a third expansion element, the heat transfer medium being able to be cooled by means of the third heat exchanger. In the storage apparatus, a larger amount of heat transfer fluid and thus thermal energy can be stored. In this manner, the first cooling cycle and the second cooling cycle can be operated so long independently of a temperature requirement in the test space until a comparatively low temperature of the heat transfer medium has been reached. For this purpose, the second cooling cycle can circulate the heat transfer medium via the second bypass. After the target temperature has been reached, the first cooling cycle and the second cooling cycle and/or the compressor and the pump can be switched off. Should it be required to cool the test space anew and/or to maintain a low temperature in the test space, the second cooling cycle can now also be operated without the first cooling cycle. For this purpose, comparatively cold heat transfer medium can be circulated from the storage apparatus via the second heat exchanger by means of the pump. Provided the heat transfer medium has significantly reheated, the first cooling cycle can be reactivated in order to cool the second cooling cycle and/or the heat transfer medium anew. Additionally or alternatively, the heat transfer medium can be cooled via the other cooling cycle using the third heat exchanger. For this purpose, the other cooling cycle can be coupled to the first condenser of the first cooling cycle via another heat exchanger. Advantageously, the storage apparatus and/or the other cooling cycle can be used for an operation of the test chamber at a temperature of −20° C. to −40° C. in the test space. Since an operation of the first cooling cycle is not always required, the energy required for operating the first cooling cycle can be saved.

First refrigerant can be dosed in such a manner via a first magnet valve by means of a first bypass in the first cooling cycle having at least one first magnet valve, which is connected downstream of the first compressor and upstream of the first condenser as well as downstream of the first expansion element and upstream of the first heat exchanger, that a temperature of the first refrigerant can be increased at the first heat exchanger. Hot gas can then be dosed in the first heat exchanger via the first bypass and the first magnet valve directly downstream of the first compressor so that the heat transfer medium is heated via the first heat exchanger. A temperature can be heated even more quickly in the test space in this manner. In particular, this method can be used advantageously at a temperature of 50° C. to 80° C. in the test space.

Further advantageous embodiments of the method are derived from the description of features of the method described and claimed.

In the following, preferred embodiments of the invention are described in further detail with reference to the attached drawings.

Figure 1:
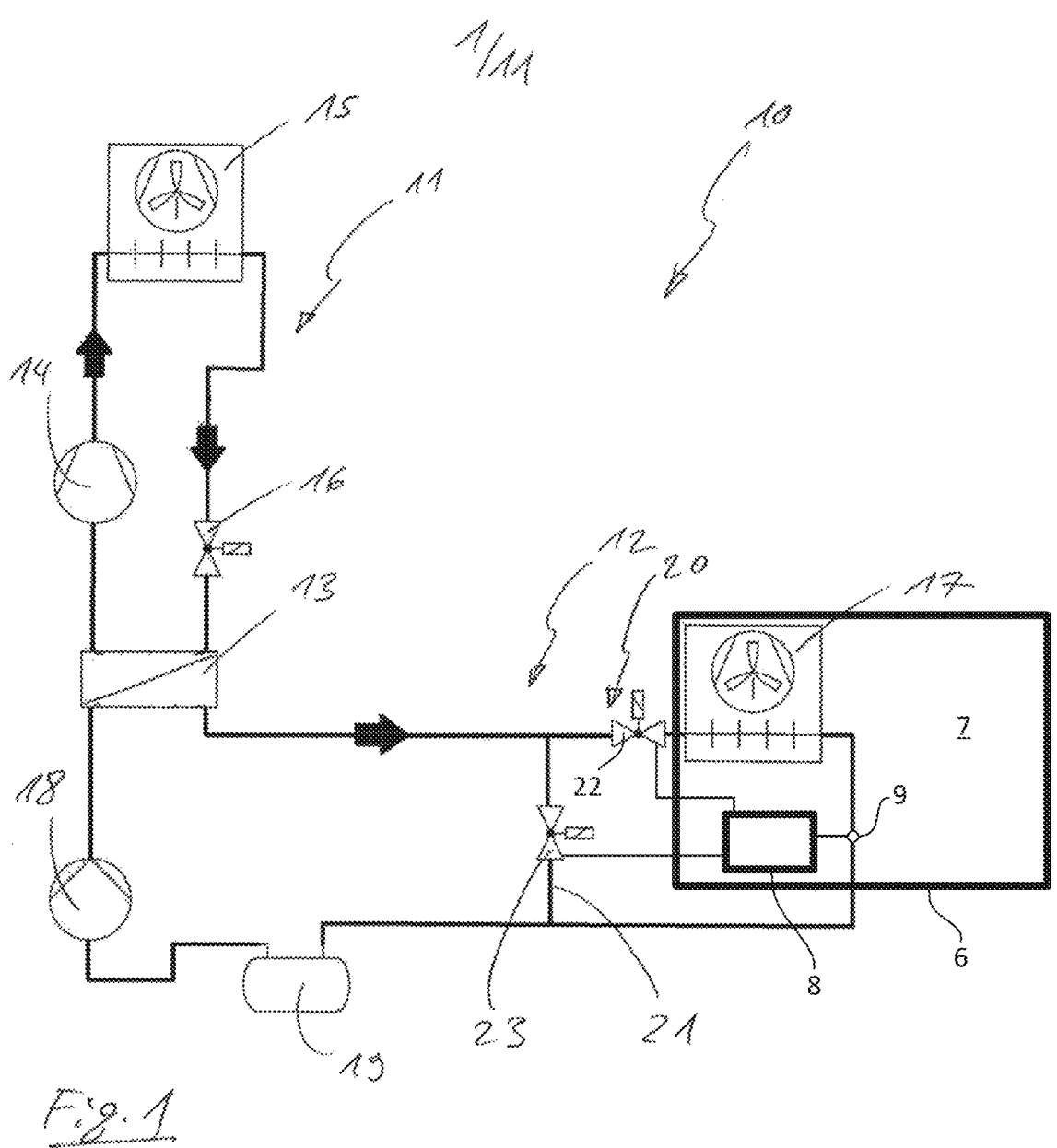
FIG. 1 shows a circuit diagram of a first embodiment of a cooling apparatus.

FIG. 1 shows a test chamber 6 by means of a schematic circuit diagram. Cooling apparatus 10 comprises a first cooling cycle 11 and a second cooling cycle 12. The first cooling cycle has a first refrigerant, a first heat exchanger 13, a first compressor 14, a first condenser 15 and a first expansion element 16. The first refrigerant is a hydrocarbon and/or a refrigerant mixture made of hydrocarbons. Second cooling cycle 12 comprises a heat transfer medium, a second heat exchanger 17, which is disposed in a test space 7, and a pump 18. Furthermore, second cooling cycle 12 comprises a storage apparatus 19 and a valve apparatus 20. Valve apparatus 20 is formed having a second bypass 21 in this instance. Second bypass 21 is connected to second cooling cycle 12 downstream of first heat exchanger 13 and upstream of second heat exchanger 17 as well as downstream of second heat exchanger 17 and upstream of pump 18. Valve apparatus 20 comprises a second magnet valve 22 downstream of first heat exchanger 13 and of the connection of second bypass 21 and another magnet valve 23 in second bypass 21. By means of first cooling cycle 11, the first refrigerant can now be conveyed, cooled and compressed via first compressor 14 and first condenser 15. The first refrigerant can then be expanded in first heat exchanger 13 via first expansion element 16 so that the heat transfer medium is cooled in first heat exchanger 13. In this context, the heat transfer medium is conveyed and/or circulated by pump 18 in second cooling cycle 12, the heat transfer medium, depending on the temperature requirement of a regulator 8 (having at least one temperature sensor 9 in the second cooling cycle) of the test chamber 6, can flow via second heat exchanger 17 and a temperature in the test space 7 can be influenced and/or lowered via second magnet valve 22 and further magnet valve 23.

Figure 2:
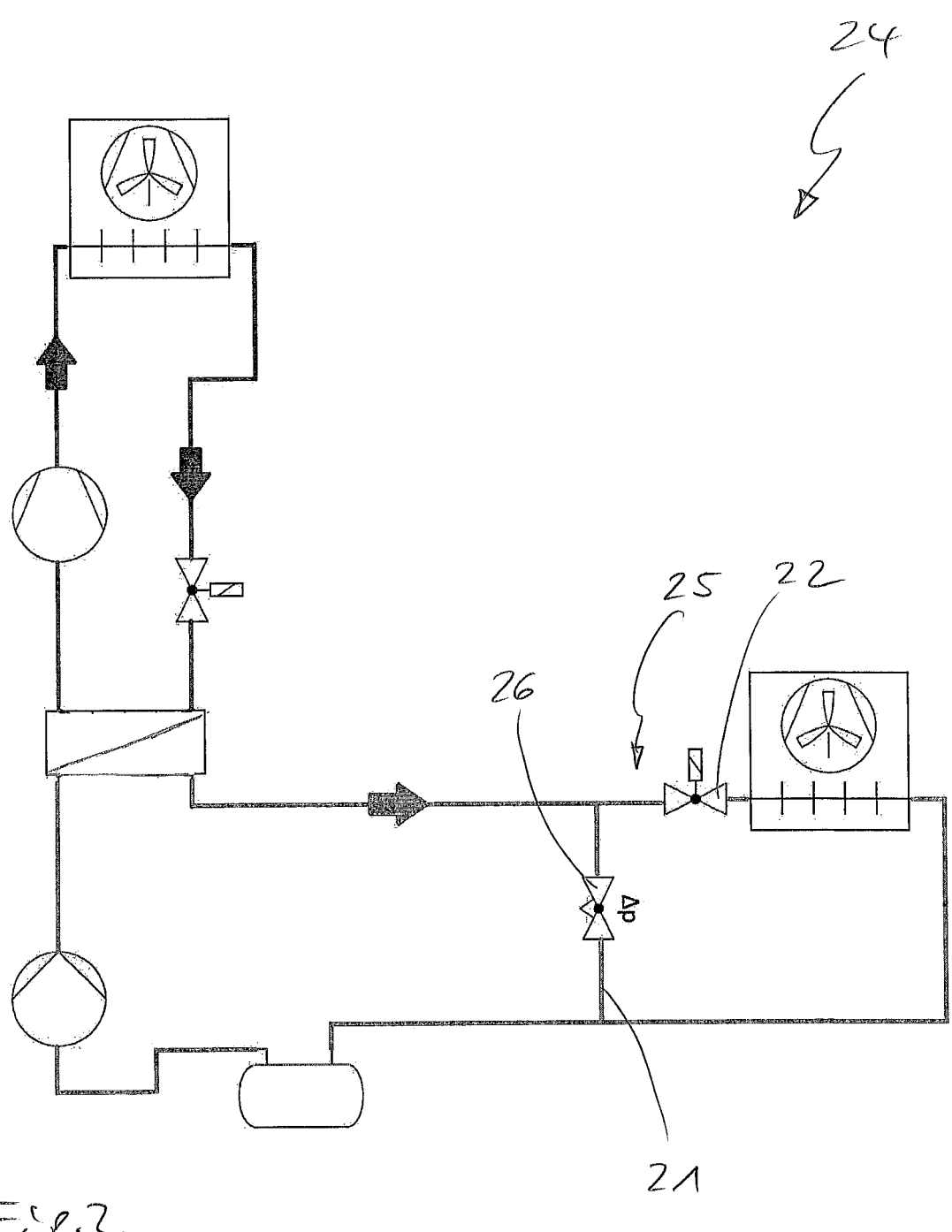
FIG. 2 shows a circuit diagram of a second embodiment of a cooling apparatus.

FIG. 2 shows a cooling apparatus 24, in which, in contrast to the cooling apparatus of FIG. 1, a valve apparatus 25 having a differential pressure regulator 26 is formed in second bypass 21. Depending on the open state of second magnet valve 22, the heat transfer medium can flow via differential pressure regulator 26 and/or via second bypass 21. Valve apparatus 26 can thus be produced particularly inexpensively.

Figure 3:
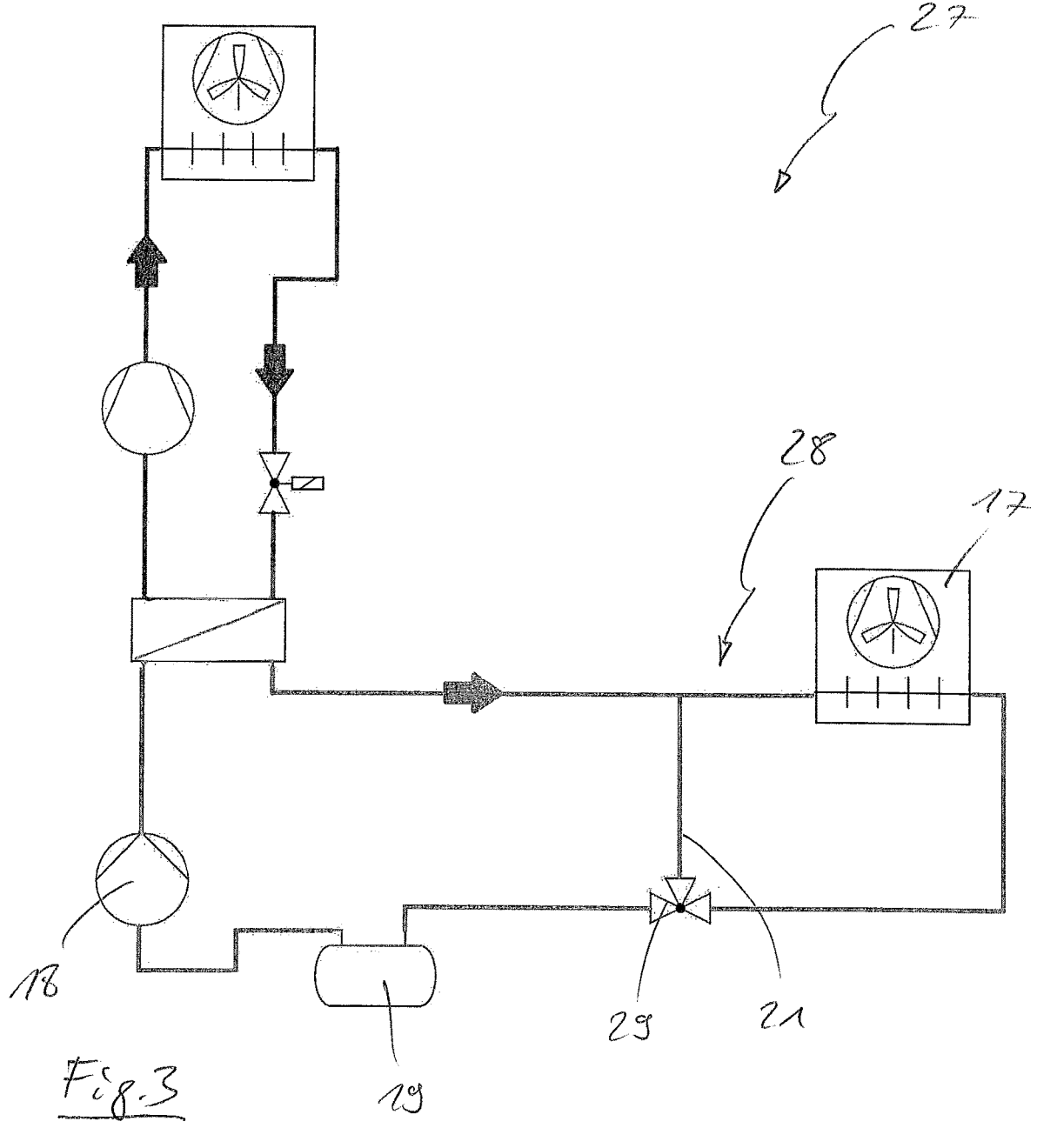
FIG. 3 shows a circuit diagram of a third embodiment of a cooling apparatus.

FIG. 3 shows a cooling apparatus 27, which, in contrast to the cooling apparatus of FIG. 1, is designed having a valve apparatus 28. Valve apparatus 28 is designed having a three-way valve 29, which is connected to second bypass 21 downstream of second heat exchanger 17 and upstream of pump 18 and/or storage apparatus 19. Via three-way valve 29, second heat exchanger 17 can be optimally supplied with the heat transfer medium.

Figure 4:
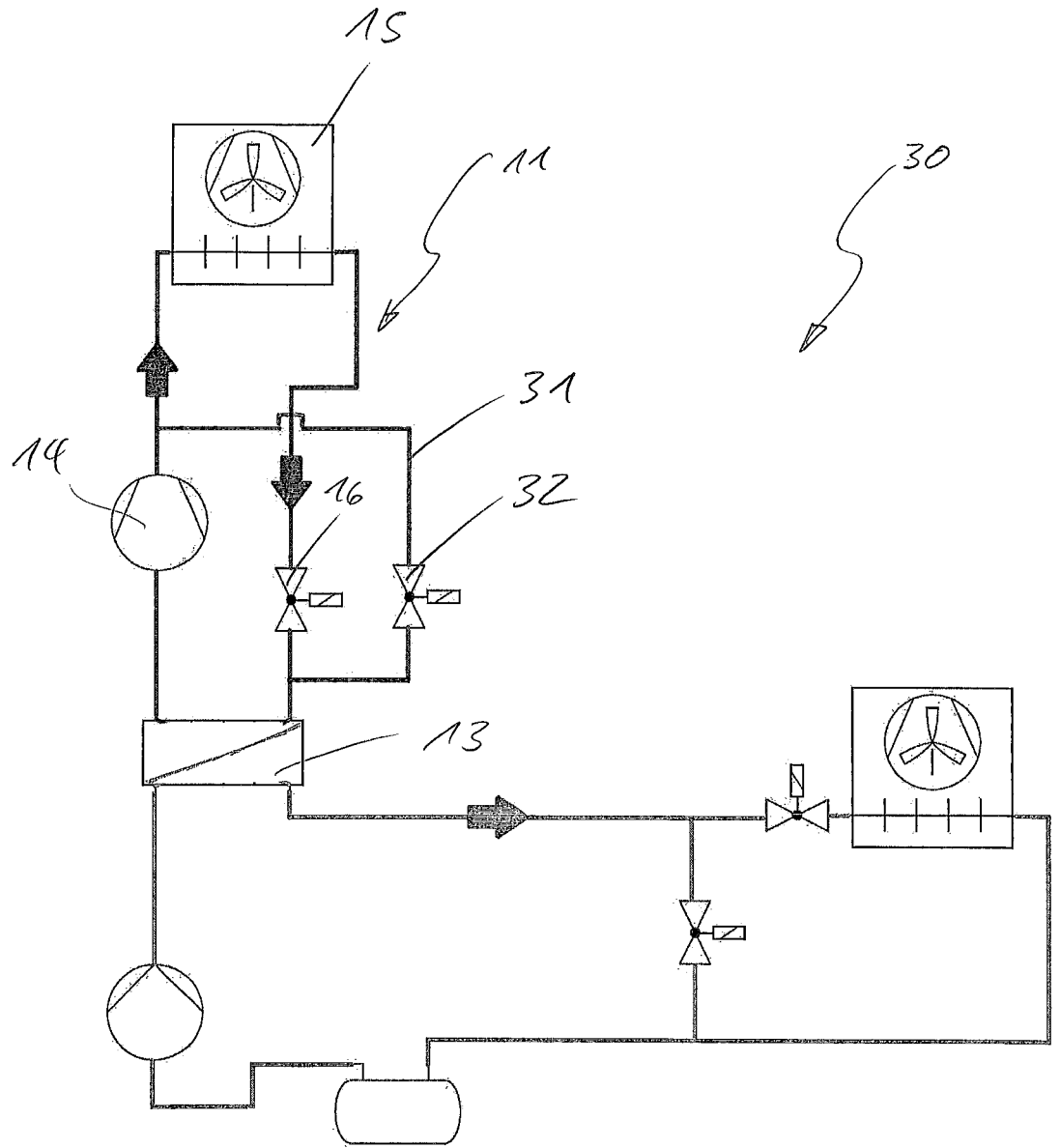
FIG. 4 shows a circuit diagram of a fourth embodiment of a cooling apparatus.

FIG. 4 shows a cooling apparatus 30, in which, in contrast to the cooling apparatus of FIG. 1, a first bypass 31 having a first magnet valve 32 is formed in first cooling cycle 11. First bypass 31 is connected downstream of compressor 14 and upstream of condenser 15 as well as downstream of first expansion element 16 and upstream of first heat exchanger 13. Via first magnet valve 32, first refrigerant can be dosed such that a temperature of the first refrigerant at first heat exchanger 13 is increased. For this purpose, first expansion element 16 is closed. Thus it becomes possible for the hot gas and/or first refrigerant to enter first heat exchanger 13 from first compressor 14 via first bypass 31 and to reach first compressor 14 again from there. This allows reaching a temperature of up to 90° C. at first heat exchanger 13, for example. This allows heating the heat transfer medium at first heat exchanger 14, when it is advantageous.

Figure 5:
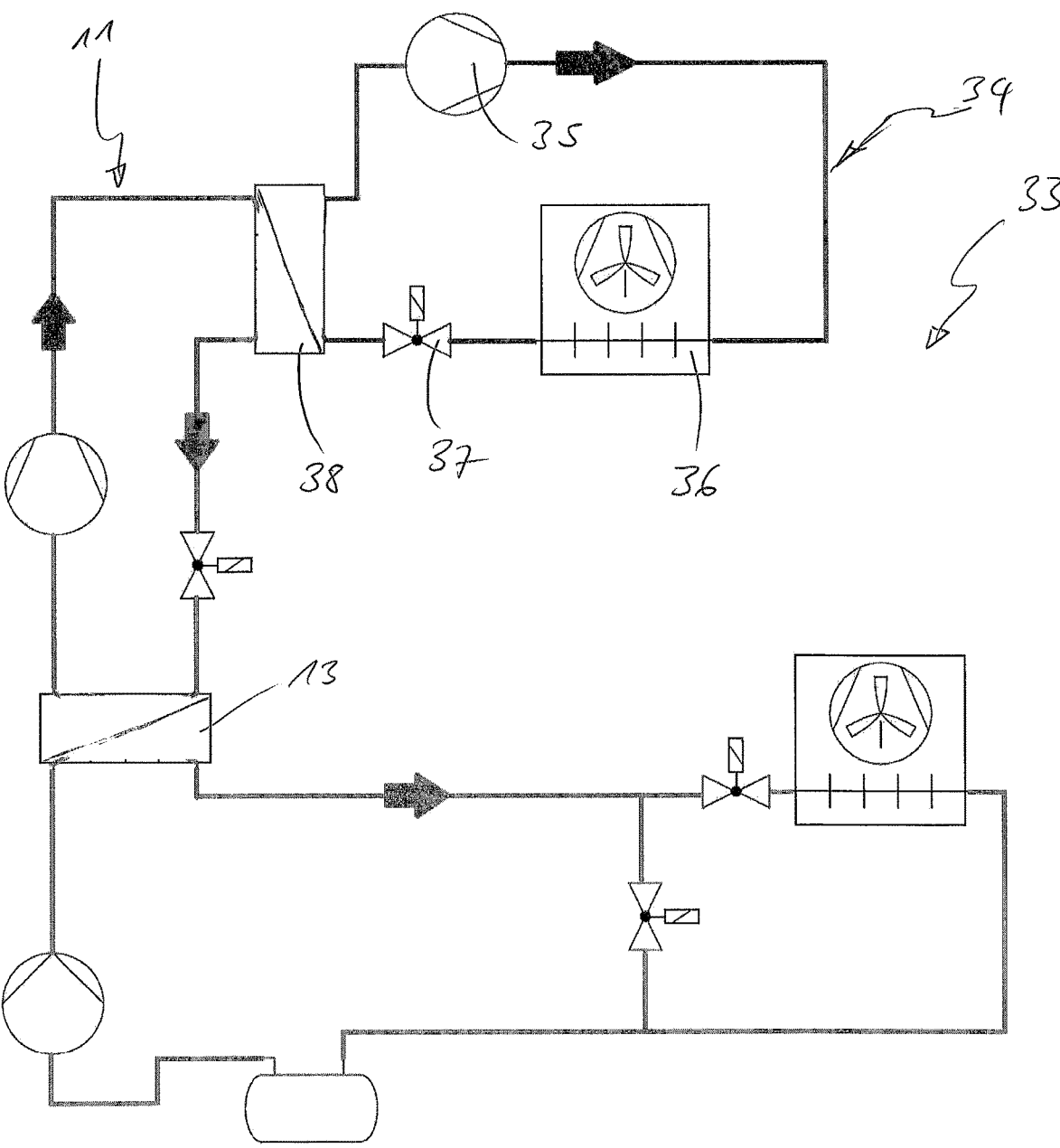
FIG. 5 shows a circuit diagram of a fifth embodiment of a cooling apparatus.

FIG. 5 shows a cooling apparatus 33, which, in contrast to the cooling apparatus of FIG. 1, has another cooling cycle 34. Further cooling cycle 34 is designed having another refrigerant, another compressor 35, another compressor 36 and another expansion element 37. In this context, further cooling cycle 34 is coupled to first cooling cycle 11 via another heat exchanger 38. Further heat exchanger 34 thus corresponds to the first condenser of first cooling cycle 11 and/or fulfills its function. By coupling cooling cycles 11 and 34, an even lower temperature can be generated at first heat exchanger 13.

Figure 6:
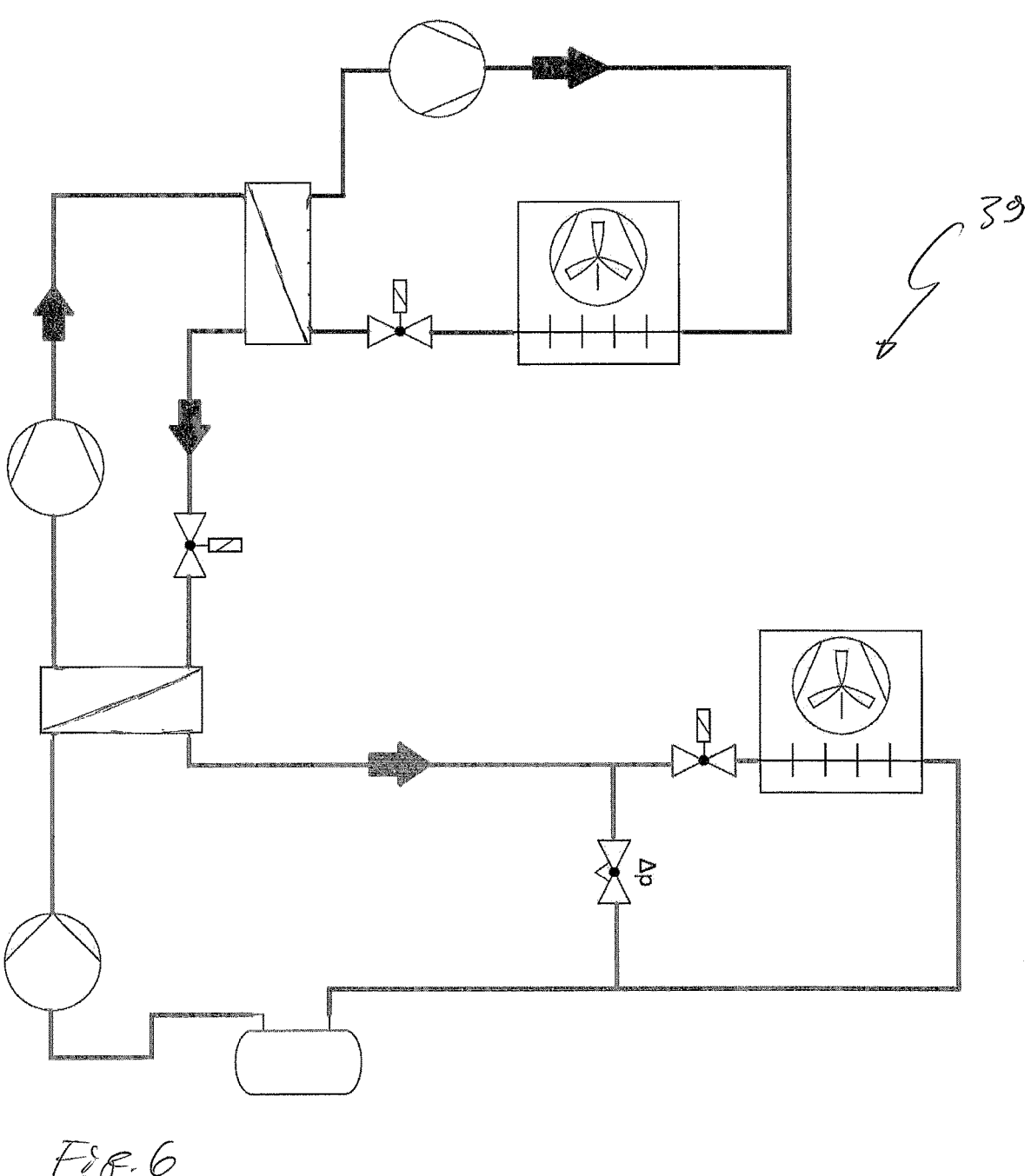
FIG. 6 shows a circuit diagram of a sixth embodiment of a cooling apparatus.

FIG. 6 shows a cooling apparatus 33, which, in contrast to the cooling apparatus of FIG. 5, has the valve apparatus of the cooling apparatus of FIG. 2.

Figure 7:
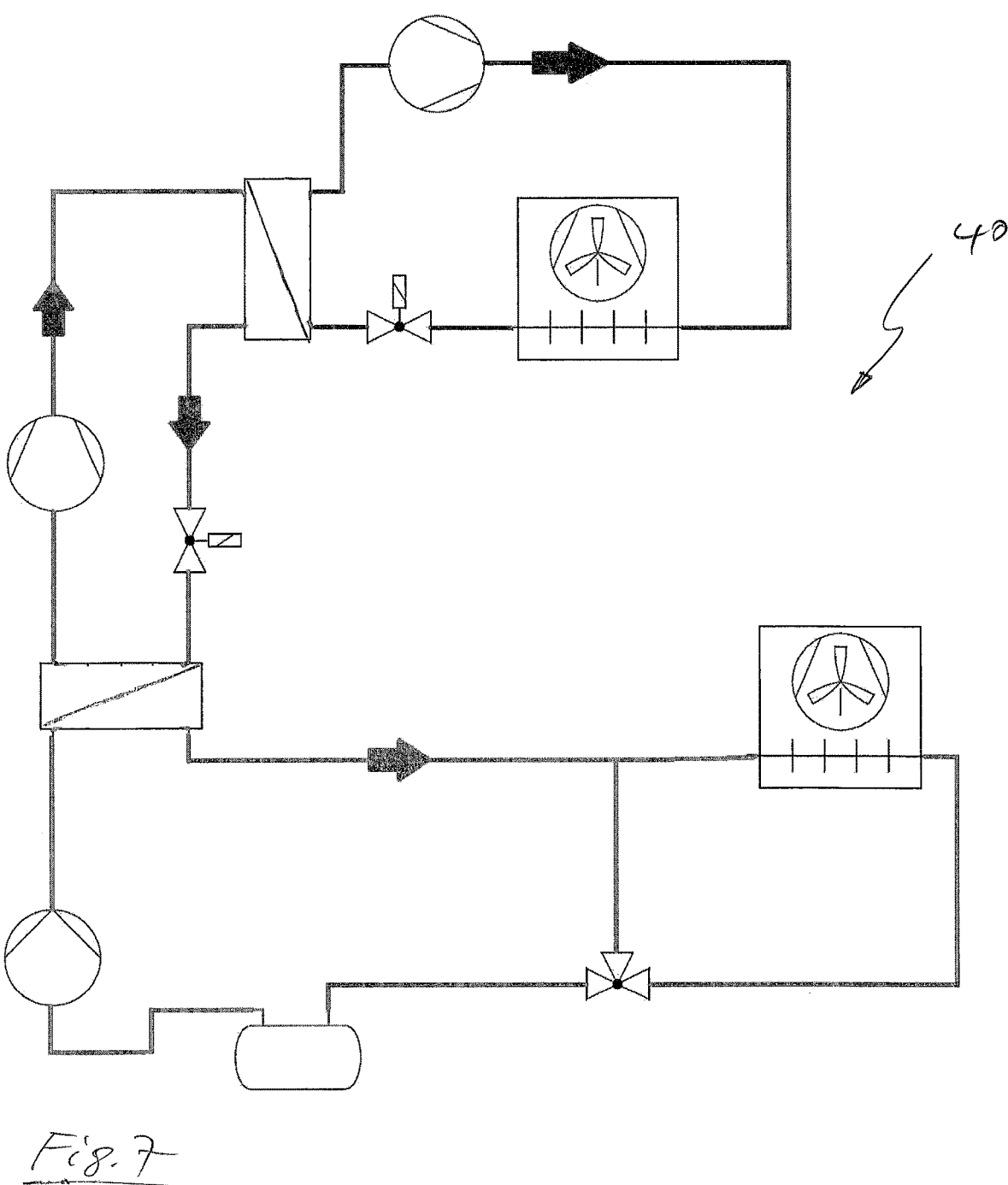
FIG. 7 shows a circuit diagram of a seventh embodiment of a cooling apparatus.

FIG. 7 shows a cooling apparatus 40, which, in contrast to the cooling apparatus of FIG. 5, has the valve apparatus of the cooling apparatus of FIG. 3.

Figure 8:
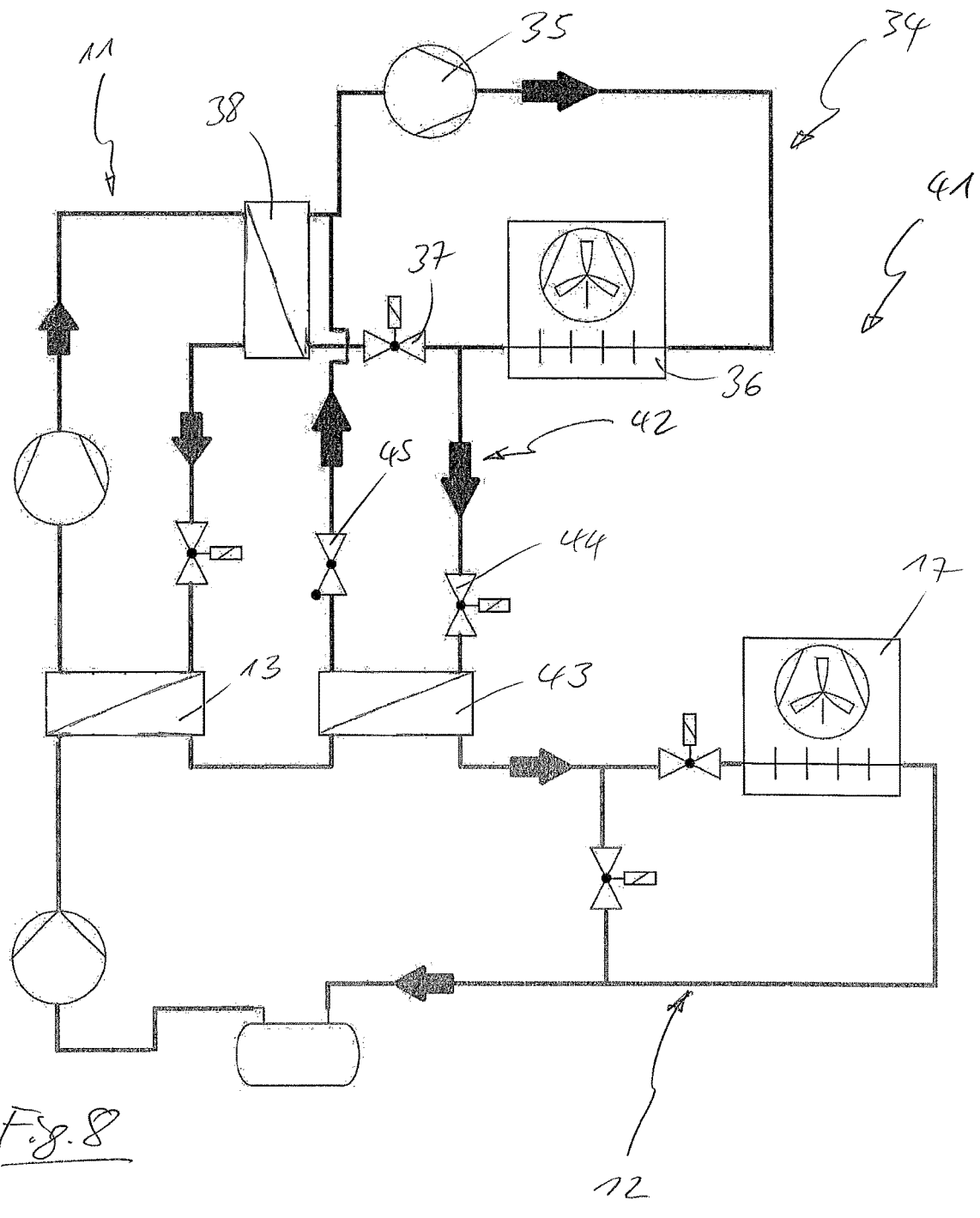
FIG. 8 shows a circuit diagram of an eighth embodiment of a cooling apparatus.

FIG. 8 shows a cooling apparatus 41, which, in contrast to the cooling apparatus of FIG. 5, has another bypass 42. Further bypass 42 is formed having a third heat exchanger 43 and a third expansion element 44. Furthermore, a non-return valve 42 is disposed in further bypass 42. Further bypass 42 is connected to further cooling cycle 34 downstream of further condenser 36 and upstream of further expansion element 37 as well as to further cooling cycle 34 downstream of further heat exchanger 38 and upstream of further compressor 35. Via third expansion element 44, further refrigerant can be dosed in further heat exchanger 43 when further expansion element 37 is closed. A reflux of further refrigerants in third heat exchanger 43 can be prevented by non-return valve 45 when third expansion element 44 is closed and further expansion element 37 is open. Further, second cooling cycle 12 is coupled to further cooling cycle 34 via third heat exchanger 43. Third heat exchanger 43 is connected downstream of first heat exchanger 13 and upstream of second heat exchanger 17 in second cooling cycle 12. Provided very low temperatures are not required at second heat exchanger 17, first cooling cycle 11 can be circumvented by means of further bypass 42 and the heat transfer medium can be cooled solely via further cooling cycle 34 and/or further bypass 42.

Figure 9:
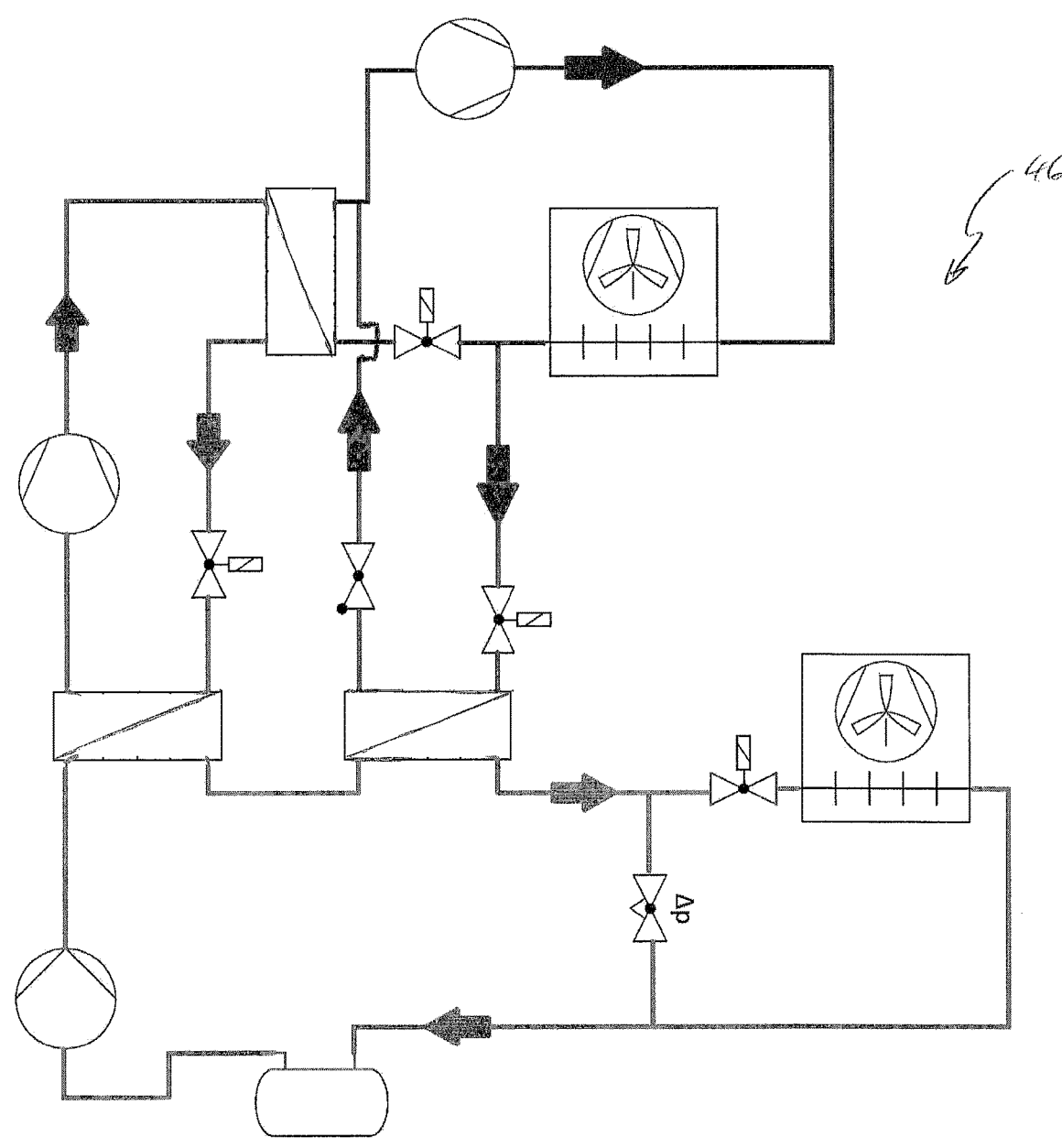
FIG. 9 shows a circuit diagram of a ninth embodiment of a cooling apparatus.

FIG. 9 shows a cooling apparatus 46, which, in contrast to the cooling apparatus of FIG. 8, has the valve apparatus shown in FIG. 2.

Figure 10:
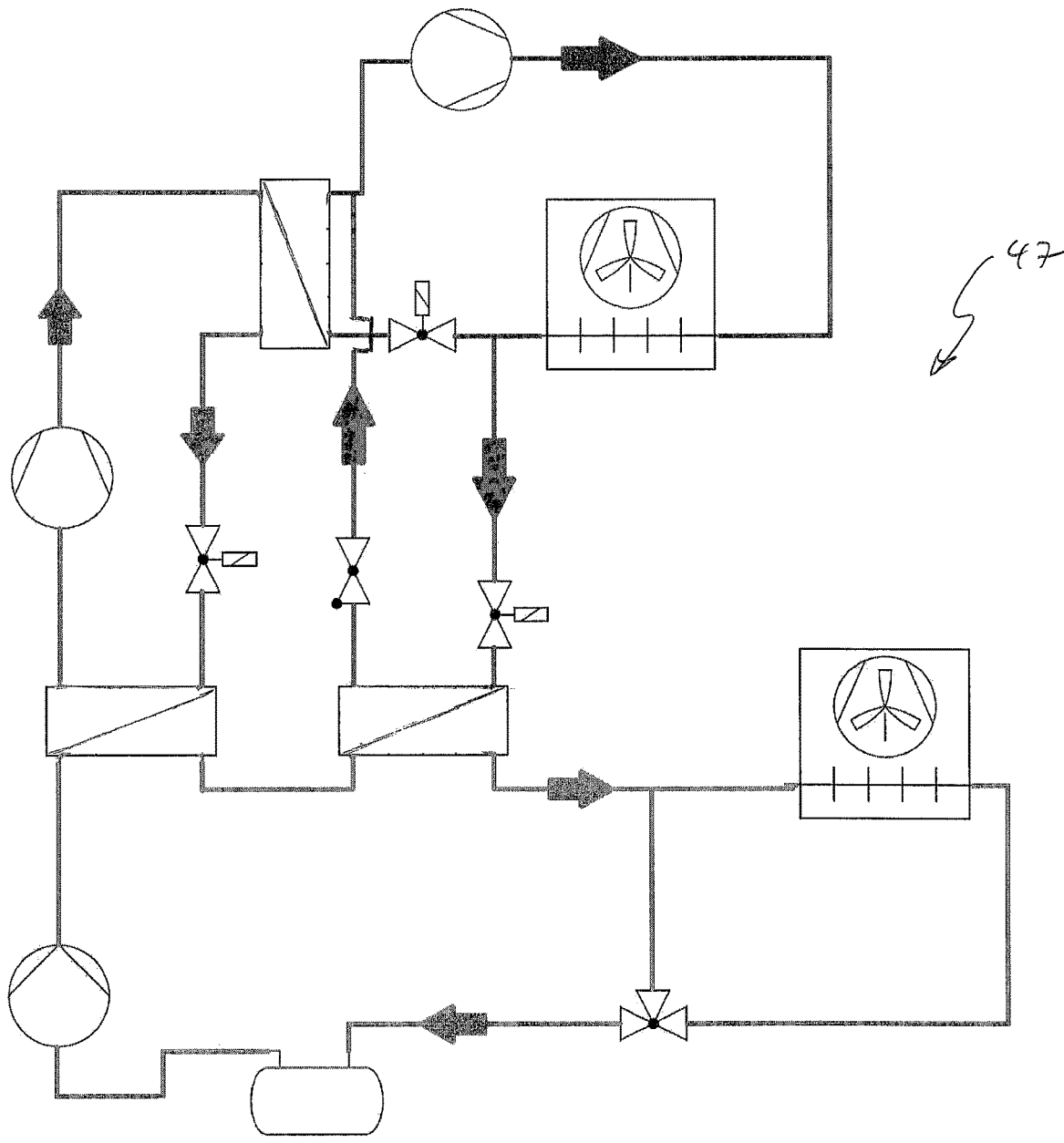
FIG. 10 shows a circuit diagram of a tenth embodiment of a cooling apparatus.

FIG. 10 shows a cooling apparatus 47, which, in contrast to the cooling apparatus of FIG. 8, has the valve apparatus shown in FIG. 3.

Figures 11, 12:
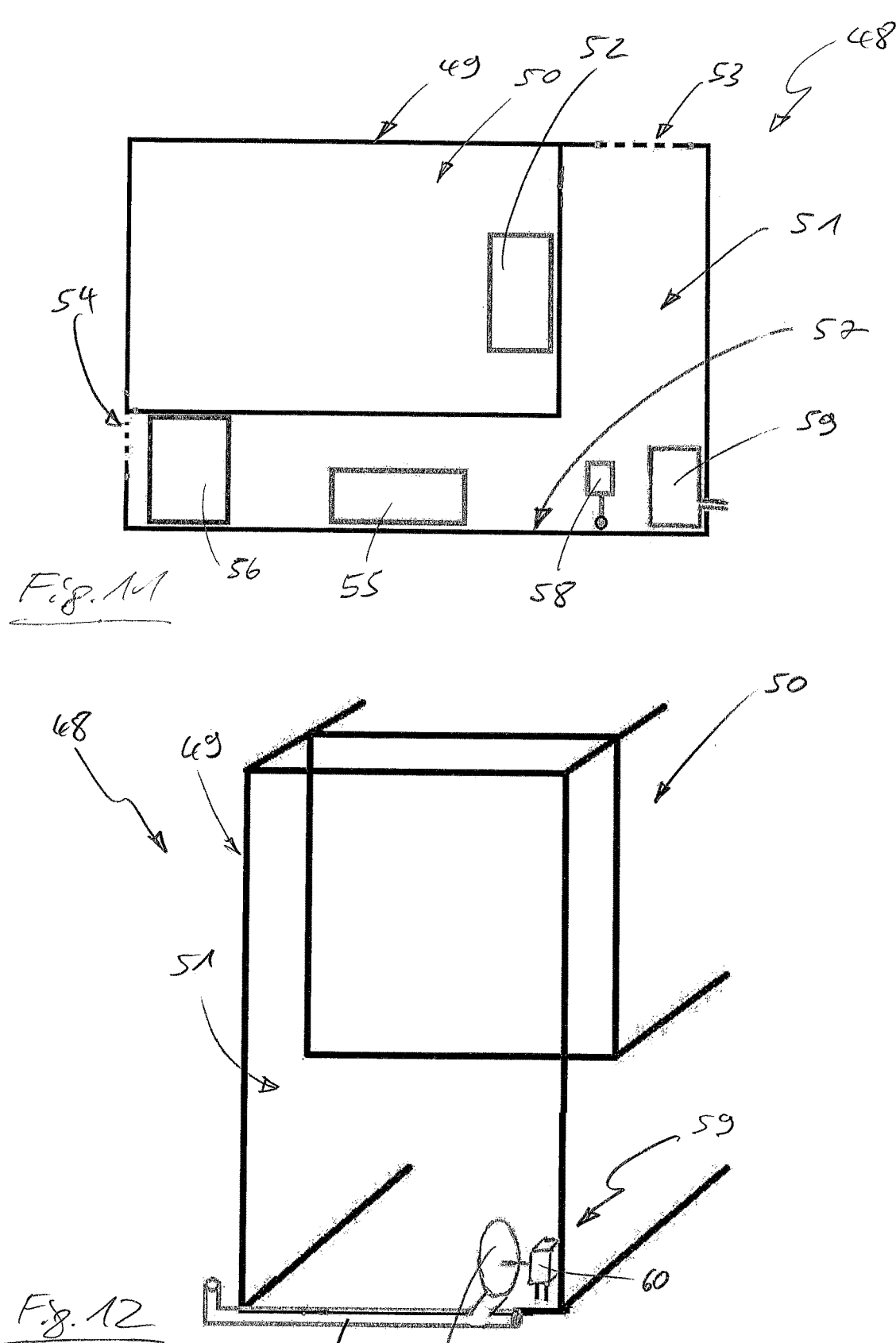
FIG. 11 shows a schematic cut view of a test chamber.
FIG. 12 shows a perspective partial view of the test chamber from FIG. 11.

FIGS. 11 and 12 show a schematic drawing of a test chamber 48 having a casing 49, within which a test space 50 and an engine room 51 are formed. A second heat exchanger 52 of a cooling cycle (not shown) is disposed in test space 50. Openings 53 and 54 are formed in engine room 51 for venting engine room 51. Furthermore, a first compressor 55 and a first condenser 56 of a first cooling cycle (not shown) are disposed in engine room 51 (shown schematically). A gas sensor 58 of a detector (not shown) is disposed at a bottom 57 of engine room 51. In addition, a ventilation installation 59 is provided in engine room 51. Ventilation installation 59 comprises a fan motor 60, a fan 61 and an exhaust tube 62. For this purpose, exhaust tube 62 extends outside of casing 49. In the event that gas sensor 58 should detect leaking hydrocarbon in engine room 51, ventilation installation 59 is activated, by means of which engine room 51 is vented.

The invention claimed is:

1. A test chamber for conditioning air, the test chamber comprising a temperature-insulated test space, which is closable to an environment and serves for receiving test material, and a temperature control device for controlling the test space in temperature, a temperature ranging from −40° C. to +180° C. being generable within the test space by the temperature control device, the temperature control device comprising a cooling apparatus having a first cooling cycle and a second cooling cycle, the first cooling cycle having a first refrigerant, a first heat exchanger, a first compressor, a first condenser and a first expansion element, the first refrigerant being a hydrocarbon or a refrigerant mixture made of hydrocarbons, wherein the second cooling cycle is made of a heat transfer medium, a second heat exchanger in the test space and a pump, the second cooling cycle being coupled to the first cooling cycle by the first heat exchanger;

wherein the temperature control device comprises a regulator having at least one temperature sensor in the second cooling cycle, at least one valve apparatus being able to be actuated in the second cooling cycle by the regulator as a function of a measured temperature; and wherein the valve apparatus is formed having a three-way valve, which is disposed downstream of the second heat exchanger and upstream of the pump in the second cooling cycle, the second bypass being connected to the three-way valve.

2. The test chamber according to claim 1, wherein
the first refrigerant is inflammable and the heat transfer medium is nonflammable.

3. The test chamber according to claim 1, wherein
the first refrigerant is free of fluorinated hydrocarbons.

4. The test chamber according to claim 1, wherein
a storage apparatus for the heat transfer medium is disposed in the second cooling cycle.

5. The test chamber according to claim 1, wherein
the second cooling cycle has a second bypass having the valve apparatus, the second bypass being connected downstream of the first heat exchanger and upstream of the second heat exchanger as well as downstream of the second heat exchanger and upstream of the pump, the heat transfer medium being able to be dosed in such a manner via the valve apparatus that the second heat exchanger is able to be bridged by the second bypass.

6. The test chamber according to claim 1, wherein
the test chamber comprises a detector having at least one gas sensor and a ventilation installation in an engine room of the test chamber separated from the test space in an airtight manner, the first cooling cycle being disposed entirely in the engine room.

7. A method for conditioning air in a temperature-insulated test space of a test chamber, the test space being closable with respect to an environment and serving to receive test material, a temperature ranging from −40° C. to +180° C. being generated within the test space by a temperature control device of the test chamber, a temperature being generated within the test space by a cooling apparatus of the temperature control device having a first cooling cycle and a second cooling cycle, the first cooling cycle having a first refrigerant, a first heat exchanger, a first compressor, a first condenser and a first expansion element, the first refrigerant being a hydrocarbon or a refrigerant mixture made of hydrocarbons, wherein the second cooling cycle is made of a heat transfer medium, a second heat exchanger in the test space and a pump, the second cooling cycle being coupled to the first cooling cycle by the first heat exchanger, the heat transfer medium being circulated in the second cooling cycle by the pump;

wherein the temperature control device comprises a regulator having at least one temperature sensor in the second cooling cycle, at least one valve apparatus being able to be actuated in the second cooling cycle by the regulator as a function of a measured temperature; and wherein the valve apparatus is formed having a three-way valve, which is disposed downstream of the second heat exchanger and upstream of the pump in the second cooling cycle, a second bypass being connected to the three-way valve.

8. The method according to claim 7, wherein
the heat transfer medium is circulated in the second cooling cycle without phase changes.

9. The method according to claim 7, wherein
the heat transfer medium being circulated in the second cooling cycle via the second heat exchanger and/or a second bypass by the valve device.

10. The method according to claim 9, wherein
the heat transfer medium is circulated via the second bypass until a target temperature of the heat transfer medium has been reached, the heat transfer medium being circulated via the second heat exchanger when the target temperature has been reached.

11. The method according to claim 9, wherein
a revolution speed of the pump is regulated by the regulator.

12. The method according to claim 9, wherein
upon reaching a target temperature of the heat transfer medium, the first compressor is switched off by the regulator, the heat transfer medium being circulated in the second cooling cycle and the second heat exchanger via a storage apparatus for the heat transfer medium, and/or the second cooling cycle being coupled to a third heat exchanger of another cooling cycle, to another refrigerant, to another compressor, to another condenser and to a third expansion element, the heat transfer medium being cooled by the third heat exchanger.

* * * * *